(12) United States Patent
Shukla et al.

(10) Patent No.: US 8,191,027 B2
(45) Date of Patent: May 29, 2012

(54) VALIDATION OF AN INTEGRATED CIRCUIT FOR ELECTRO STATIC DISCHARGE COMPLIANCE

(75) Inventors: Vrashank Gurudatta Shukla, Bangalore (IN); James Garrett Homack, Dallas, TX (US); John Eric Kunz, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 512 days.

(21) Appl. No.: 11/867,012

(22) Filed: Oct. 4, 2007

(65) Prior Publication Data
US 2009/0094568 A1    Apr. 9, 2009

(51) Int. Cl.
*G06F 17/50* (2006.01)
(52) U.S. Cl. ............... 716/132; 716/115; 716/136
(58) Field of Classification Search ............... None
See application file for complete search history.

(56) References Cited

U.S. PATENT DOCUMENTS

| | | | |
|---|---|---|---|
| 5,796,638 A | | 8/1998 | Kang et al. |
| 5,867,399 A | * | 2/1999 | Rostoker et al. ............... 716/18 |
| 6,493,850 B2 | * | 12/2002 | Venugopal et al. ........... 716/112 |
| 6,553,542 B2 | * | 4/2003 | Ramaswamy et al. ............ 716/2 |
| 7,103,862 B2 | * | 9/2006 | Sung et al. .................... 716/103 |
| 7,243,317 B2 | * | 7/2007 | Wang et al. .................... 716/112 |
| 7,496,877 B2 | * | 2/2009 | Huber et al. ....................... 716/8 |
| 7,558,720 B1 | * | 7/2009 | Berigei et al. .................. 703/14 |
| 7,853,909 B2 | * | 12/2010 | Kobayashi et al. ........... 716/106 |
| 2008/0104554 A1 | * | 5/2008 | Kobayashi et al. ............... 716/4 |
| 2008/0201677 A1 | * | 8/2008 | Baker et al. ....................... 716/8 |

OTHER PUBLICATIONS

Theng et al., "Optimized Clamp Deployment with Simulation and Characterization in Full-Chip ESD (Electro-Static-Discharge) Design," ICSE2006 Proc. 2006, Kuala Lumpur, Malaysia, pp. 759-763.*

* cited by examiner

*Primary Examiner* — Leigh Garbowski
(74) *Attorney, Agent, or Firm* — Lawrence J. Bassuk; W. James Brady; Frederick J. Telecky, Jr.

(57) ABSTRACT

An aspect of the present invention validates ESD compliance by examining netlist data generated from a schematic level design of an integrated circuit. Routing and placement may be performed only after confirming that whether each protected circuit (having exposure to ESD current, without the protection circuit) is protected by an appropriate protection circuit. As a result, the design cycle time may be reduced. According to another aspect of the present invention, layout guidelines for each protection circuit is also considered in performing the routing and placement. As a result, the number of iterations in a design cycle may be reduced.

7 Claims, 4 Drawing Sheets

VALIDATION OF AN INTEGRATED CIRCUIT FOR ELECTRO STATIC DISCHARGE COMPLIANCE

BACKGROUND

1. Field

The present disclosure relates software tools used in computer aided design (CAD) of integrated circuits, and more specifically to a method and apparatus for validating integrated circuits for electro static discharge (ESD) compliance.

2. Related Art

Electro static discharge (ESD) generally refers to the flow of electric charges (current) through the interface pads of an integrated circuit (IC), typically while not in use. One example of such not-in-use scenario is while packages containing the ICs are transported/moved prior to deployment in corresponding systems/devices. A common reason for the ESD is interface pads coming in contact with human beings while being deployed on systems or during transportation.

ESD is generally undesirable in that the magnitude of the current is often much higher than the magnitude for which an IC may be designed for during normal use in systems/devices. Such high current flow can damage various functional circuits within an IC, as is well known in the relevant arts. Accordingly, there has been a general need to avoid ESD current flowing through the functional circuits within an IC, as is well known in the relevant arts.

Protection circuits are accordingly often implemented associated with the portions functional circuits and/or the pads to avoid the flow of ESD current through functional circuits (Aprotected circuits@). Validation of an IC for ESD compliance generally refers to ensuring adequate protection circuit for each portion of a functional circuit that may be susceptible to ESD discharge noted above. Such portions often provide path from a interface pad to Vdd (supply terminal) or ground.

The validation generally needs to be efficiently integrated into the design approach employed to design ICs. In one approach, an IC designer may generate a schematic circuit graphically representing electronic/electrical components (e.g., transistors, diodes, capacitors) and their connectivity in a schematic phase. The netlist (textual representation of the graphic information) resulting from the schematic phase may be used by a routing and placement phase to place the components meeting various criteria. Further checks may be performed to ensure that the eventually fabricated circuit meets various criteria.

In general, the ESD compliance validation needs to be performed within the context of at least such a design approach, while meeting one or more requirements such as reduced time to complete design (prior to fabrication), simplicity, reduced effort, etc.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention validates ESD compliance by examining netlist data generated from a schematic level design of an integrated circuit. Routing and placement may be performed only after confirming that whether each protected circuit (having exposure to ESD current, without the protection circuit) is protected by an appropriate protection circuit. As a result, the design cycle time may be reduced.

According to another aspect of the present invention, layout guidelines for each protection circuit is also considered in performing the routing and placement. As a result, the number of iterations in a design cycle may be reduced.

According to yet another aspect of the present invention, another netlist may be extracted from layout information (generated by routing and placement), with the another netlist including parasitic information between nodes of a protection circuit. The acceptability of the parasitic may also thus be verified at the netlist level. As a result, a single verification engine operating at netlist level, can be implemented for verification before and after routing/placement.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Integrated Circuit

Figure 1:
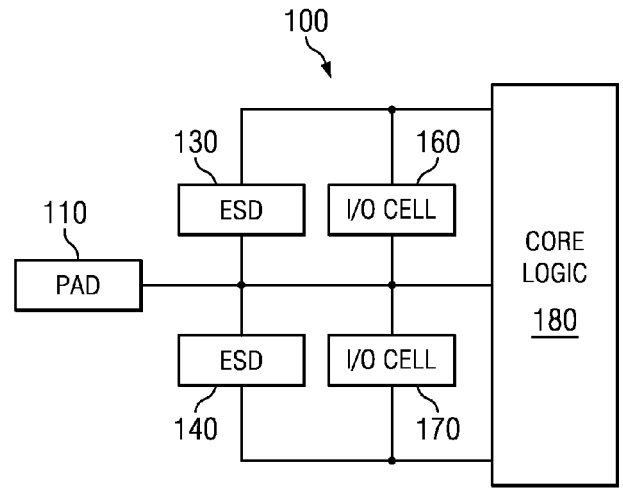
FIG. 1 is block diagram of a portion of an integrated circuit in relation to which several aspects of the present invention can be implemented.

FIG. 1 is block diagram of a portion of an integrated circuit illustrating the general need for of an ESD protection circuit. The block diagram is shown containing I/O pad 110, ESD circuits 130 and 140, input/output (I/O) cells 170 and 160, and core logic 180. Each block is described below in further detail.

Core logic 180 operates to provide desired utility for which the integrated circuit is primarily designed. Core logic 180 processes signal received on pad 110 and send the result of the processing on the pad 110. However, different pads can be used for input and output respectively. Portions of core logic 180 may also be required to be protected circuits, but is not addressed the present application merely in the interest of conciseness.

Each of I/O cells 170 and 160 operates as an interface/buffer between the pad 110 and core logic 180. Each I/O cell may operate to change the signal level in either direction to suit the interface requirements of core logic/external devices. For example, I/O cell may reduce a signal level to a suitable internal signal value (before providing to core logic 180) and vice versa. The I/O cells represent example protected circuits.

I/O pad 110 provides an interface for making an external connection to integrated circuit 100. An I/O pad is generally formed of a conductive metal portion provided on the surface of a package containing the integrated circuit. Often, pad 210 is soldered to a conducting path (not shown) on a printed circuit board. The signals received from the conducting path are provided to core logic 180 and vice versa.

Protection circuits 130 and 140 operate to protect respective I/O cells 160 and 170, and core logic from ESD current noted above in the Background Section. As noted in that section, integrated circuits need to be validated for ESD compliance (ESD verification) within a framework of approaches used for design of integrated circuits.

Several aspects of the present invention provide for such validation. The features of the invention may be appreciated in comparison with a prior approach in which one or more aspects of the present invention are not implemented. Accordingly an example prior approach is described first below.

3. Example Prior Approach

Figure 2:
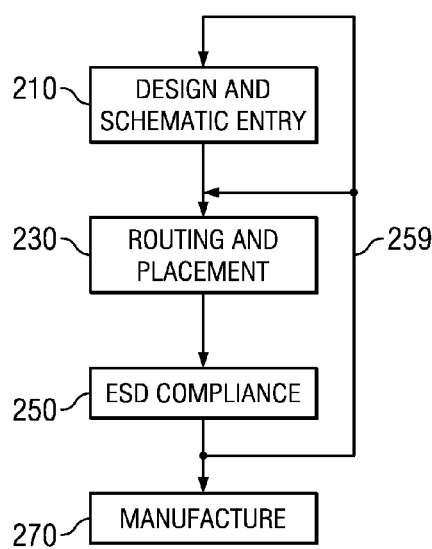
FIG. 2 is a flow diagram illustrating a design approach, including ESD validation, in one prior embodiment.
Figure 3:
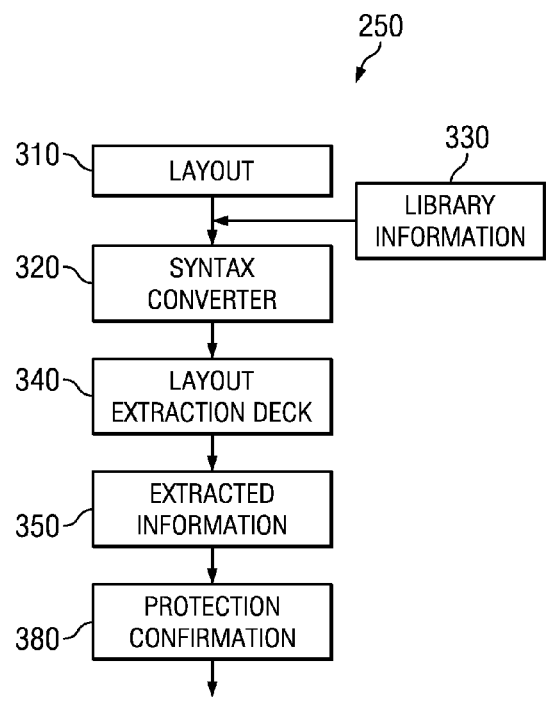
FIG. 3 is a flow diagram illustrating the manner in which ESD validation is performed in a prior embodiment.

FIGS. 2 and 3 are flow diagrams illustrating the ESD verification in the context of one prior design approach. In block 210, a designer may graphically design a desired integrated circuit using various design tools (e.g., Spice tool, AutoCAD tool) and generate a netlist. Netlist represents the graphic information in a pseudo-code (typically representable as text), which can be processed easily by computer instructions. The netlist indicates the electrical/electronic components and their connectivity, as specified by the designer.

In block 230, routing and placement of the design represented by the netlist, is performed. Additional guidelines from libraries, etc., may also be used in performing routing and placement. Routing and placement may be performed using various tools (e.g., Virtuoso software from Cadence Corporation, Astro/Magma Blast Fusion software from Synopsys) available in the industry. If any desired criteria (e.g., propagation delays, bus width, cross talk, etc.) is not met, the IC design may need to be continued with block 210 described above.

Layout information representing the specific location of underlying structure (e.g., channel information for transistors, plate information for capacitors) supporting each component on the die on which the IC is to be fabricated, and path information (e.g., bus width, material, etc.), is generated due to the routing and placement. The layout information may be in the form of various masks to be used in fabrication, described below.

In block 250, verification for ESD compliance is performed by examining the layout information. Other checks (power compliance, IR-drop compliance, etc.) may also be performed in block 250, but are not shown/described for conciseness. Non-compliance of the circuit for ESD protection may require that the phases of 210 and/or 230 be revisited.

In block 270, once the design complies with the compliance requirements, the mask information from block 230 is used to fabricate ICs.

The approach of FIG. 2 may be inefficient for multiple reasons. For example, since ESD verification is performed after placement 230, both 210 and 230 may need to be performed when protection circuit is to be corrected or added. In addition, ESD specific requirements may not be checked by routing and placement 230 (e.g., parasitic requirements specific to components forming protection circuit).

Some of the inefficiencies may be further clear by understanding the details of ESD verification 250 and accordingly details of ESD verification 250 in one embodiment are described below first.

4. ESD Verification

FIG. 3 is a flow diagram illustrating the details of ESD verification (of block 250) in one prior embodiment. Layout information 310 (resulting from routing and placement 230) is received.

Library information 330 contains information representing the various circuit portion types (e.g., I/O cells) and corresponding protection circuit types, the number of external interface (pads) present in the circuit. The library information may also contain rules, with each rule being designed for a specific type of protection circuit. As may be appreciated, different circuit portions (sought to be protected) may require different type of protection circuits, and a rule may be provided associated with each type. The rule may further indicate the type of circuit portions the protection circuit would protect when deployed.

Syntax converter 320 reads the layout information 310 and library information 330, and provides the combined information in a common format (readable) for further processing by layout extraction deck 340.

Layout extraction deck 340 identifies protection circuit instances corresponding to each type defined in a rule of the library. The protected circuits corresponding to each protection circuit may also be extracted from layout information 330. The output of layout extraction deck 340 is stored in extracted information 350 (in Netlist format in a file). The output contains the list of bond pads, and for each bond pad the associated protection circuits and protected circuits. The output may also contain various parasitics (capacitance, path resistance, etc.) of the paths connecting the components.

Protection confirmation 380 checks whether there are any bond pads that are not connected based on the extracted information 350. Protection confirmation 380 may match each protected circuit with the corresponding protection circuit and determine whether the protection circuit effective protects the protected circuit (based on various ESD guidelines, which may be received as a part of library information), and can be implemented in a known way. Protection confirmation 380 may also check whether the parasitic components (due to layout stage 230) affect the desired protection. A report of the checking may be provided to facilitate any necessary changes.

It may be appreciated that extraction of the protected/protection circuits is performed by defining rules in the extraction rule deck. New rules may thus be needed for each additional protection/protected circuit types. The definition of such rules is again overhead for the designers, as well as, adds to the complexity of the overall implementation/verification.

Various aspects of the present invention overcome at least one or more the disadvantages noted above.

5. Netlist Based ESD Validation

Figure 4:
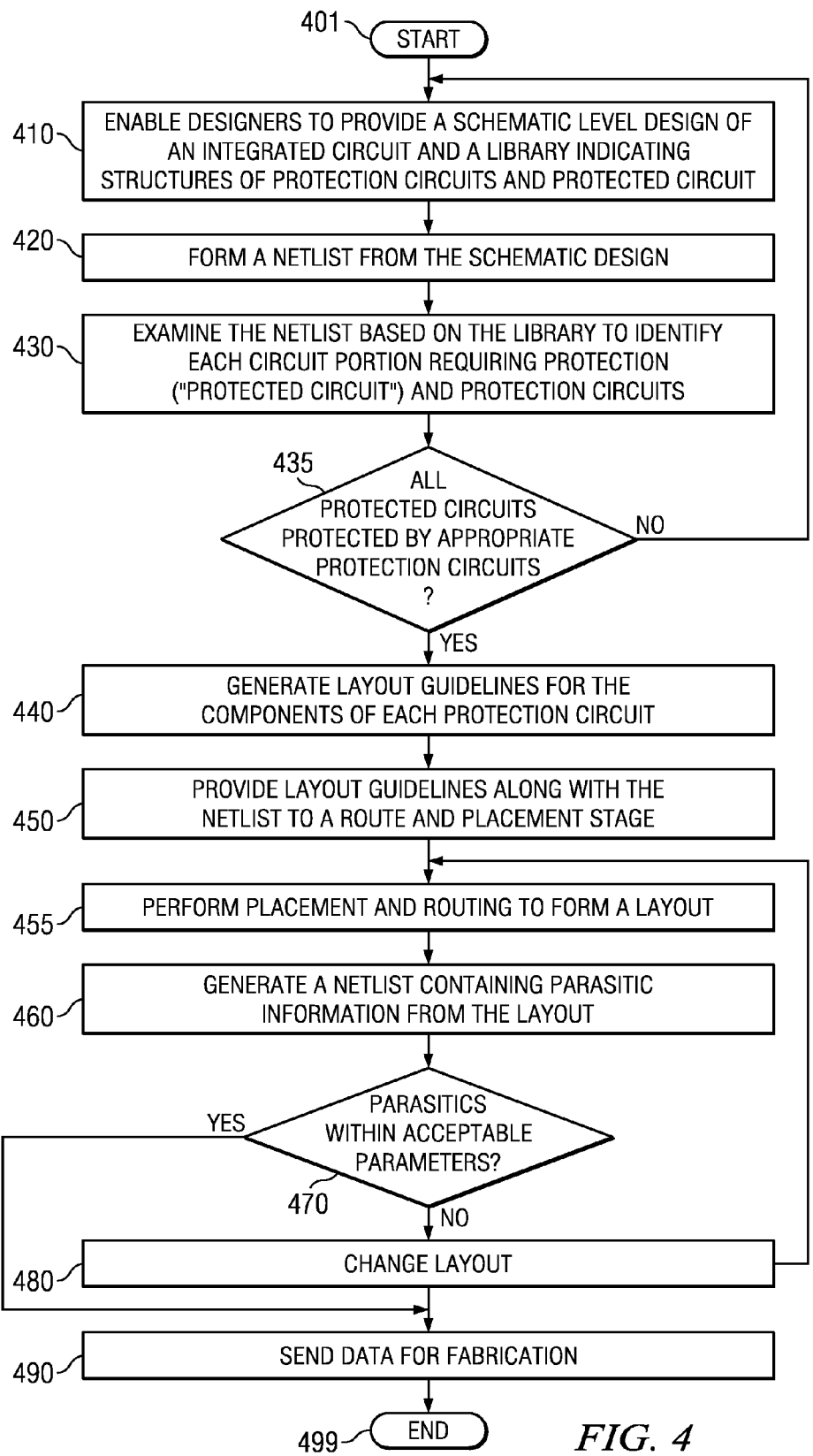
FIG. 4 is a flow chart illustrating the manner in which an integrated circuit is designed in an embodiment of the present invention.

FIG. 4 is a flowchart illustrating the manner in which an integrated circuit can be designed in an embodiment of the present invention. The features herein can be integrated, for example, into a CAD based design/verification tool and accordingly is described with respect to a design tool merely for illustration. The tool can be implemented as a single computer program (provided by a single vendor) or multiple programs (provided by respective vendors) operating according to pre-specified interfaces.

Figure 6:
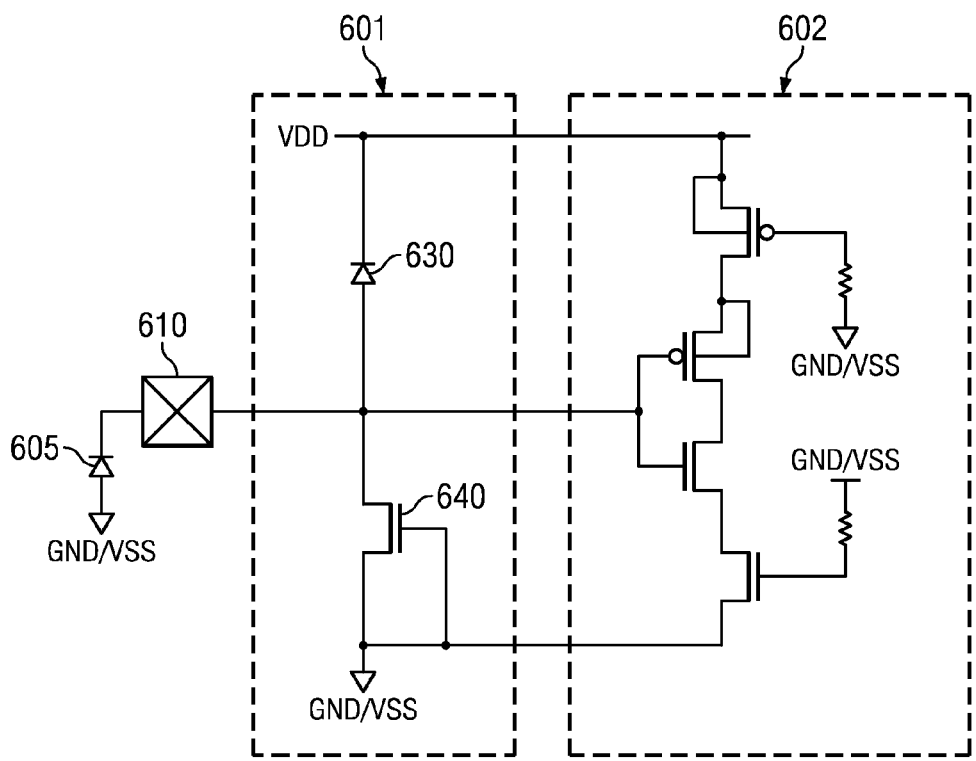
FIG. 6 is a circuit diagram used to illustrate some features of the present invention.

Further, the flowchart is described with respect to the circuit of FIG. 6 merely for illustration. However, the features can be implemented in relation to various other integrated circuits (of much higher complexity as well), as will be apparent to one skilled in the relevant arts by reading the disclosure provided herein. The flowchart starts in step 401, in which control passes to step 410.

In step 410, a design tool enables designers to provide a schematic level design of an integrated circuit. The designers may further provide a library indicating the general structures (components and connectivity) of protection circuits and protected circuits. The library may be provided according to any convention and be updated based on the content/purpose of the integrated circuit sought to be designed.

Thus, with respect to FIG. 6, the schematic level design may substantially be similar to the display of FIG. 6. The library may indicate that structure such as 601 represents a protection circuit for a structure such as 602 represents the corresponding protected circuit.

In step 420, the design tool forms a netlist from the schematic design. Various commercially available tools can be used to enter the schematic level diagram, and the tool may be designed to generate the netlist as well. In general, designers specify various components and connectivity information using an appropriate GUI (graphics user interface).

In step 430, the design tool examines the netlist based on the library to identify each circuit portion requiring protection (Aprotected circuit@) and protection circuits connected to each pad. Each structure in the library may be compared with various portions in the netlist for such identification.

Thus, with respect to FIG. 6, the design tool may determine that there is pad 610, and that there is only a single protection circuit 601 for protected circuit 602 associated with pad 610. From the comparisons, structures 601 and 602 may be respectively identified as the protection circuit and the protected circuit.

In step 435, the design tool determines if all protected circuits are protected by appropriate protection circuits. Such determination is made based on various design rules defined by technology development team responsible for responsible for ESD guidelines. designers for the integrated circuit. Each design rule may specify an approved protection circuit structure and corresponding protected circuit topologies. Thus, a design rule may indicate a structure such as 601 is appropriate for a cascode buffer structure such as 602.

If the result of the determination is yes, control passes to step 440, else to step 410. With respect to FIG. 6, as structure 601 is an appropriate protection circuit for protected circuit 602, control passes to step 440. However, if there are identified protected structures that are not protected (e.g., due to design oversight in step 410), control would pass to step 410 (so that the designer can add the appropriate protection structures).

In step 440, the design tool generates layout guidelines for the components of each protection circuit. Layout guidelines may indicate maximum parasitics permitted between two nodes (e.g. the maximum parasitic limit between the source terminal of transistor 640 and ground Vss, the maximum parasitic limit between the drain terminal of transistor 640 to pad 610) in a protection circuit. The guidelines may be computed dynamically based on various parameters (e.g., junction capacitance, stray capacitance, etc.) related to the components of the protected and protection circuits.

In step 450, the design tool provides layout guidelines along with the netlist to a route and placement stage. The guidelines may be provided in the form of various values suitable as inputs for placement and routing. For example, the parasitic values computed may be converted into bus thickness, distance, etc., and provided along with the netlist.

In step 455, the design tool performs placement and routing to form a layout, and can be performed in a known way. Due to the use of the guidelines of step 440, the placement of components may accordingly be affected. In the illustrative examples noted above, the drain terminal of transistor 640 may be placed close to pad 610, and the source terminal may be placed close to ground to stay within the parasitic limits. Alternatively, the thickness of the paths may be increased to reduce the parasitics.

In step 460, the design tool may generate a netlist containing parasitic information from the layout. Such information can be generated using various >extraction=techniques, well known in the relevant arts.

In step 470, the design tool determines whether the parasitics are within acceptable limits. The acceptable limits may also be received in the form of design guidelines from designers. Control passes to step 480 is there is a violation or else to step 490.

In step 480, the design tool may require the designer to change the layout, and control passes to step 455. The designers may be indicated the violated limits/parameters, such that appropriate adjustments can be performed.

In step 490, the layout information in the form of masks is sent for fabrication. The flowchart ends in step 499.

From the above it may be appreciated that the design cycle time may be reduced both due to detection of errors prior to layout phase, in addition to providing additional constraints (guidelines) to routing/placement stage of the design tool. The description is continued with respect to an example architecture implementing some of the features described above.

6. Architecture

Figure 5:
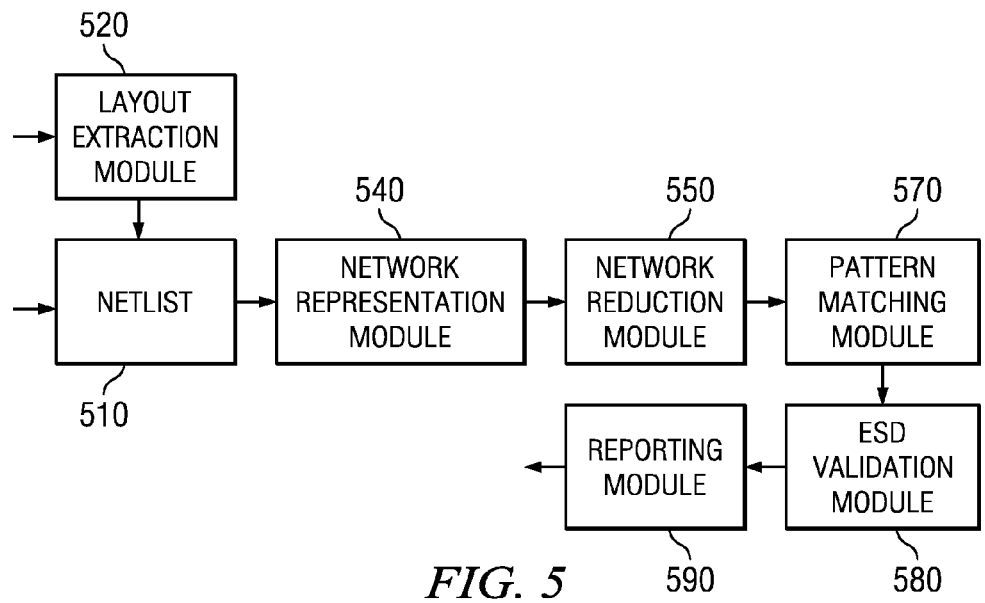
FIG. 5 is a block diagram illustrating the ESD verification in an embodiment of the present invention.

FIG. 5 is a block diagram illustrating an example architecture in which at least some of the features described above can be implemented. Netlist 510 represents both the netlist generated from schematic design and the extracted information in step 460 (represented by layout extraction module 520). Since both are represented in a common representation, common modules (verification tools) can be used downstream. The common modules in an example implementation are described below in further detail.

Network representation module 540 reads the information (components, connectivity, and optionally the parasitic information) received as net list 510 and maintains the information in a efficient geometric format. For example, each component may be converted into a corresponding geometric representation, with the magnitudes of the geometry potentially representing the size type attributes of the component. The geometric representative may provide higher level abstract view (e.g., structure 602 as a cascode buffer) also. The conversion from net list to graph format is performed using well-known approaches.

Network reduction module 550 reduces parasitic networks into compact RC representation on VDD and VSS/ground bus. Large RC network on VDD and VSS bus are obtained due to large RC extractions techniques used for extracting the layout. The reduction enables faster topology checking and path tracing.

Pattern matching module 570 locates stamps of ESD circuit (assuming the circuits in the library of step 410 are also converted to corresponding geometry/stamp) to identify the protection circuits. Pattern matching module 570 further searches netlist and locate protected circuits at the pads based on the available pattern defined in the configuration file (library).

Library may be updated with new protection circuit structure and protected circuit structure (Topology) in netlist (Spice) format as and when designer designs such circuits. As may be appreciated, such information is automatically checked while performing pattern matching (to detect matching protected and protection circuits).

ESD validation module 580 may first check for known bad/undesirable circuit topologies. Such circuit topologies are often specified for each integrated circuit based on the context or purpose of the integrated circuit. For example, if there are specific protected circuits, which are undesirable, such circuits may be specified in a library, and module 580 flags the occurrence of any of such undesirable protected circuits.

Further, module 580 determines whether each protection circuit is suited for the corresponding protected circuit (identified in 430/570). Geometric checks on ESD components and components connected to pads are performed to generate a report. Reporting module 590 consolidates the output error data in a user compatible format.

As noted above, the features described above may be provided in a design tool, which is implemented on one or more digital processing systems. The description is continued with respect to the details of such a system on which the design tool may be executed.

7. Digital Processing System

Figure 7:
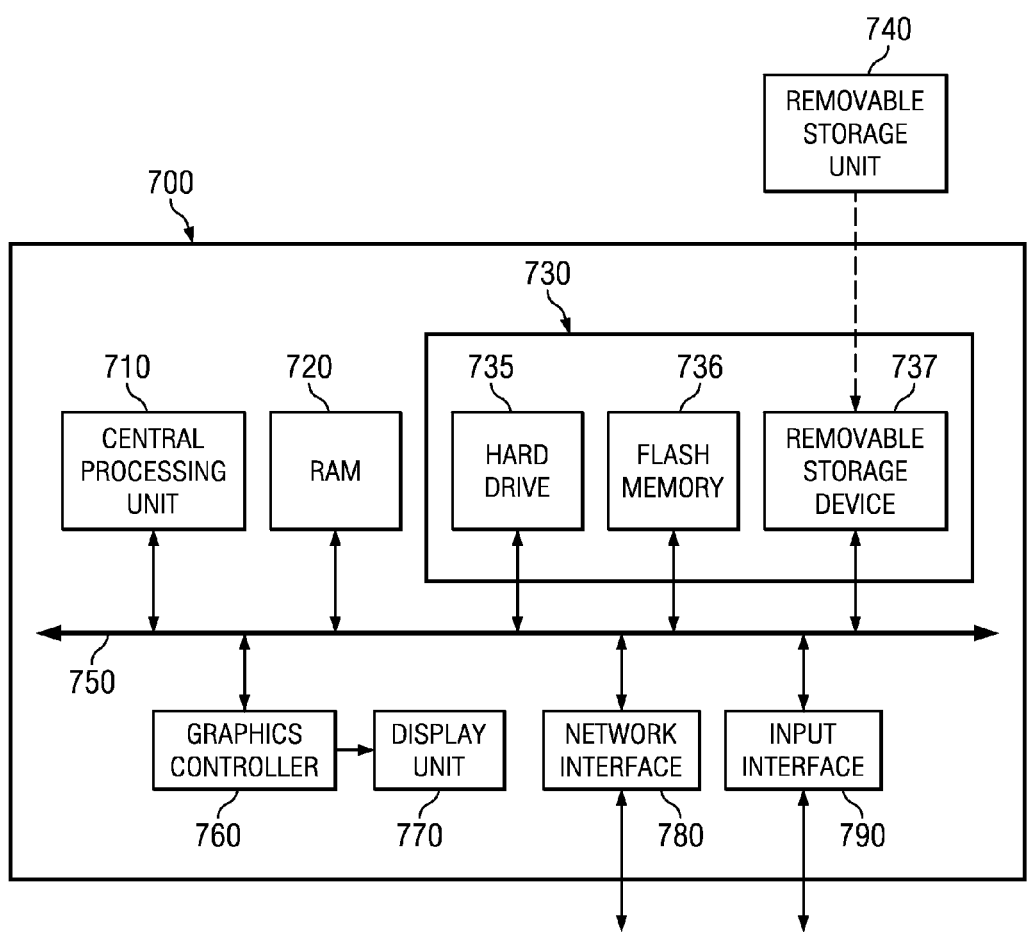
FIG. 7 is a block diagram of a digital processing system in which several features of the present invention are operative upon execution of software instructions.

FIG. 7 is a block diagram of computer system 700 illustrating an example system for implementing the design tool (s) noted above. Computer system 700 may contain one or more processors such as central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention (by performing tasks corresponding to various approaches described above). CPU 710 may contain multiple processing units, with each processing unit potentially being designed for a specific task. Alternatively, CPU 710 may contain only a single processing unit. RAM 720 may receive instructions from secondary memory 730 using communication path 750.

Graphics controller 760 generates display signals (e.g., in RGB format) to display unit 770 based on data/instructions received from CPU 710. Display unit 770 contains a display screen to display the images defined by the display signals. Input interface 790 may correspond to a key-board and/or mouse, and generally enables a user to provide inputs. Network interface 780 enables some of the inputs (and outputs) to be provided on network of FIG. 7. In general, display unit 770, input interface 790 and network interface 780 enable designers to interact with the design tool according to various features described above.

Secondary memory 730 may contain hard drive 735, flash memory 736 and removable storage drive 737. Secondary storage 730 may store the software instructions (which perform the actions specified by various flow charts above) and data (e.g., topology of the modules, cell libraries, library, rules), which enable computer system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. However, the computer readable storage medium can be on other types of memories (removable or not, volatile or non-volatile). An embodiment of the present invention is implemented using software running (that is, executing) in computer system 700.

In this document, the term "computer program product" is used to generally refer to removable storage unit 740 or hard disk installed in hard drive 735. These computer program products are means for providing software to computer system 700. As noted above, CPU 710 may retrieve the software instructions, and execute the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A computer readable storage medium storing one or more sequences of instructions facilitating design of integrated circuits, wherein execution of said one or more sequences of instructions by one or more processors contained in said digital processing system causes said one or more processors to perform the actions of:

receiving a schematic level design of an integrated circuit, wherein said schematic level design indicates a plurality of components connected by a plurality of path according to a topology;

forming a netlist from said schematic level design, wherein said netlist indicates said plurality of components connected according to said topology;

examining said netlist to identify a set of protected circuits requiring protection from electro static discharge and to determine whether each protected circuit is protected by an appropriate protection circuit; and performing a routing and placement of said integrated circuit based on said netlist if each protected circuit is protected by appropriate protection circuit, wherein said routing and placement is performed after said examining, wherein said receiving further receives a library indicating a corresponding structure for each of said protection circuit and said protected circuit, wherein said examining compares each structure with information in said netlist to identify said protected circuits and said protection circuits.

2. The computer readable medium of claim 1, wherein said receiving further receives a plurality of rules, with each rule indicating an appropriate protection circuit type for each protected circuit type, wherein said examining uses said plurality of rules in said determining.

3. The computer readable medium of claim 1, wherein said library represents each structure in a geometrical form, said method further comprising representing each component of said netlist also in said geometric form, wherein said examining compares said geometric forms to determine whether each protected circuit is protected by an appropriate protection circuit.

4. The computer readable medium of claim 1, wherein routing and placement generates a layout, said method further comprising:
    extracting another netlist from said layout, wherein said another netlist indicates a parasitic information between two nodes resulting from said placement and routing; and
    checking said another netlist to ensure that said parasitic information is within an acceptable parameter.

5. The computer readable medium of claim 4, wherein said computing further comprising performing said routing and placement again if said parasitic information is not within said acceptable parameter.

6. A computer readable storage medium storing one or more sequences of instructions for designing integrated circuits, comprising the steps of:
    receiving a schematic level design of an integrated circuit, wherein said schematic level design indicates a plurality of components connected by a plurality of path according to a topology;
    forming a netlist from said schematic level design, wherein said netlist indicates said plurality of components connected according to said topology;
    examining said netlist to identify a set of protected circuits requiring protection from electro static discharge and to determine whether each protected circuit is protected by an appropriate protection circuit; and
    performing a routing and placement of said integrated circuit based on said netlist if each protected circuit is protected by appropriate protection circuit, wherein said routing and placement is performed after said examining,
    wherein said receiving further receives a library indicating a corresponding structure for each of said protection circuit and said protected circuit,
    wherein said examining compares each structure with information in said netlist to identify said protected circuits and said protection circuits, and
    wherein said receiving further receives a plurality of rules, with each rule indicating an appropriate protection circuit type for each protected circuit type, wherein said examining uses said plurality of rules in said determining.

7. A digital processing system comprising:
    a processor; and
    a memory device coupled to the processor, wherein the processor retrieves and executes stores instructions comprising:
    receiving a schematic level design of an integrated circuit, wherein said schematic level design indicates a plurality of components connected by a plurality of path according to a topology;
    forming a netlist from said schematic level design, wherein said netlist indicates said plurality of components connected according to said topology;
    examining said netlist to identify a set of protected circuits requiring protection from electro static discharge and to determine whether each protected circuit is protected by an appropriate protection circuit; and
    performing a routing and placement of said integrated circuit based on said netlist if each protected circuit is protected by appropriate protection circuit, wherein said routing and placement is performed after said examining,
    wherein said receiving further receives a library indicating a corresponding structure for each of said protection circuit and said protected circuit,
    wherein said examining compares each structure with information in said netlist to identify said protected circuits and said protection circuits, and
    wherein said receiving further receives a plurality of rules, with each rule indicating an appropriate protection circuit type for each protected circuit type, wherein said examining uses said plurality of rules in said determining.

* * * * *